(12) United States Patent
Takashi

(10) Patent No.: US 11,292,394 B2
(45) Date of Patent: Apr. 5, 2022

(54) ARTICLE STORAGE STRUCTURE

(71) Applicant: Toyota Jidosha Kabushiki Kaisha, Toyota (JP)

(72) Inventor: Toshinobu Takashi, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 174 days.

(21) Appl. No.: 16/726,324

(22) Filed: Dec. 24, 2019

(65) Prior Publication Data
US 2020/0223369 A1    Jul. 16, 2020

(30) Foreign Application Priority Data

Jan. 15, 2019 (JP) .............................. JP2019-004416

(51) Int. Cl.
*B60R 7/08*        (2006.01)
(52) U.S. Cl.
CPC ...................................... *B60R 7/08* (2013.01)
(58) Field of Classification Search
CPC .. B60R 7/08; B60R 7/02; B60R 11/06; B60R 5/04; B60R 2011/0036
USPC ......................................... 296/37.8; 410/120
See application file for complete search history.

(56) References Cited

U.S. PATENT DOCUMENTS

| 4,081,118 A  | * | 3/1978  | Mason ...................... B60R 9/08 |
|              |   |         | 224/324                                |
| 8,807,408 B2 | * | 8/2014  | Kreis ........................ B60R 7/08 |
|              |   |         | 296/37.8                               |
| 10,227,047 B2| * | 3/2019  | Purvis ....................... B60R 9/00 |
| 2007/0154276 A1| * | 7/2007| Dollar, Jr. ................ B60P 7/12 |
|              |   |         | 410/121                                |
| 2009/0001748 A1| * | 1/2009 | Brown .................... B60R 7/005 |
|              |   |         | 296/37.8                               |
| 2012/0286009 A1| * | 11/2012| Forbis ....................... B60R 5/04 |
|              |   |         | 224/400                                |

FOREIGN PATENT DOCUMENTS

JP        2010-285077 A    12/2010

\* cited by examiner

*Primary Examiner* — Stephen T Gordon
(74) *Attorney, Agent, or Firm* — Dinsmore & Shohl LLP

(57) ABSTRACT

A fixing component is configured such that the other end portion of the fixing component is engaged with a second support member by elastically deforming an elastic portion provided to at least one of the fixing component, a first support member, the second support member. Accordingly, the fixing component can be brought to interfere (contact) with the article so as to fix the article by an elastic force (restoring force) of the elastic portion. Since this structure requires no nut when fixing the article, no tool is required for fastening the nut, and thus the procedure of fixing the article can be reduced, compare to a case of requiring a nut (related art).

20 Claims, 9 Drawing Sheets

ARTICLE STORAGE STRUCTURE

CROSS-REFERENCE TO RELATED APPLICATIONS

This application claims priority to Japanese Patent Application No. 2019-004416 filed on Jan. 15, 2019, which is incorporated herein by reference in its entirety including the specification, drawings and abstract.

BACKGROUND

1. Technical Field

The disclosure relates to a structure of storing an in-vehicle article.

2. Description of Related Art

In a conventional gasoline vehicle or the like, an (infrequent but important) in-vehicle article, such as a puncture repair kit, is placed under the floor of a luggage room (between a pair of luggage members, as strength members, extending in the front-rear direction of the vehicle). This is because a dead space between the luggage members can cope with both storing the article and securing usability of the luggage.

On the other hand, in an HV (hybrid vehicle), a PHV (plug-in hybrid vehicle), an EV (electric vehicle), a FCV (fuel cell vehicle), an autonomous driving vehicle, or the like, compared to a conventional gasoline vehicle, the numbers (volume) of batteries and ECUs (electronic control units) are increased, and it is necessary to arrange them between luggage members, but lack of space makes it impossible to mount an in-vehicle article between the luggage members. Therefore, it is necessary to provide an opening in a left or right side or both sides of the luggage room, and store the article therein.

Japanese Patent Application Publication No. 2010-285077 discloses a structure of storing a battery held to a tray on the luggage side. The technology disclosed in this publication, in order to fix a battery, includes: a rod having a lower end engaged with a tray on one of the pair of side surfaces of the battery; and a standing wall upright from the tray on the other side surface of the battery; and a battery clamp located on an upper surface of the battery, the battery clamp having one end fastened to an upper end of the rod by fastening a nut, and having the other end engaged with an upper end of the standing wall. When a fastening force is applied to the end of the battery clamp located on the rod side, a force is applied to lift up the other standing wall side; and as a result, a downward reaction force is generated at the upper end of the standing wall, to thereby press the battery downward.

However, the structure disclosed in the above publication has the following problems. It is necessary to tighten a nut to fix the battery. Therefore, a tool and work for tightening the nut are required.

SUMMARY

An object of the present disclosure is to provide an article storage structure that does not require a tool when fixing an article, and can save more labor than in the related art.

The present disclosure for achieving the above object is as follows.

(1) An article storage structure including: an article; a fixing component interfering with the article so as to fix the article; a first support member supporting one end portion of the fixing component; and a second support member with which the other end portion of the fixing component is detachably engaged, wherein an elastic portion elastically deformable is provided to at least one of the fixing component, the first support member, and the second support member, and the fixing component interferes with the article so as to fix the article by elastically deforming the elastic portion to engage the other end portion of the fixing component with the second support member.

(2) The article storage structure according to (1), wherein: the fixing component has a curved portion between the one end portion and the other end portion of the fixing component, the curved portion being convex toward the article; and when the other end portion of the fixing component is engaged with the second support member, the curved portion is pushed against the article by an elastic force of the elastic portion.

(3) The article storage structure according to (2), wherein: the fixing component includes a one end side connecting portion that connects the one end portion to the curved portion, and the other end side connecting portion that connects the other end portion to the curved portion; and the one end side connecting portion extends linearly between the one end portion and the curved portion, and the other end side connecting portion extends linearly between the other end portion and the curved portion.

(4) The article storage structure according to (2) or (3), wherein: the article has a recess in a face of the article facing the fixing component, the recess being recessed in a direction away from the fixing component, and the curved portion is inserted in the recess when the other end portion of the fixing component is engaged with the second support member.

(5) The article storage structure according to any one of (1) to (4), further comprising a tray supporting the article, wherein the first support member and the second support member are integrally formed with the tray.

(6) The article storage structure according to any one of (1) to (5), wherein the article is an in-vehicle article, and the first support member and the second support member are fixed to a vehicle.

According to the article storage structure of the above (1), the following effects can be obtained.

Since the elastic portion is elastically deformed to engage the other end portion of the fixing component with the second support member, when the fixing component is engaged with the second support member, an elastic force (restoring force) of the elastic portion causes the fixing component to interfere (contact) with the article, to thereby fix the article. Since this structure requires no nut when fixing the article, a tool for fastening the nut is unnecessary, and thus the procedure of fixing the article can be reduced, compared to the case in which a nut is required (related art).

According to the article storage structure of the above (2), the following effects can be obtained.

Since the curved portion of the fixing component is pushed against the article by the elastic force of the elastic portion, the fixing component can fix the article and restrict the movement (rattling) of the article in the pushing direction.

In addition, since the curved portion of the fixing component is pushed against the article, more contact area between the fixing component and the article can be reduced, compared to the case in which the curved portion is not provided and substantially the entire fixing component is pushed against the article, so that a pushing load can be locally applied from the fixing component to the article. Therefore, the pushing force per unit area from the fixing component to the article can be increased, and the holding force on the article by the fixing component can be increased.

According to the article storage structure of the above (3), the following effects can be obtained.

The one end side connecting portion and the other end side connecting portion of the fixing component each linearly extend; therefore, when one end portion of the fixing component is supported by the first support member, the other end portion thereof is engaged with the second support member, and thus the curved portion is pushed against the article and receives the reaction force from the article at the same time, a force mainly applied to the one end side connecting portion and the other end side connecting portion of the fixing component can be used as a compressive force. Therefore, it is possible to suppress the one end side connecting portion and the other end side connecting portion from being bent and deformed when the fixing component receives the reaction force from the article, and thus the curved portion can be efficiently pushed against the article.

According to the article storage structure of the above (4), the following effects can be obtained.

Since the curved portion is inserted into the recess of the article, the article is only allowed to move in the directions excluding the direction of being pushed against the fixing component just until the wall surface of the recess hits (comes in contact with) the curved portion. Therefore, it is possible to restrict the article from moving in the directions excluding the direction in which the article is pushed against the fixing component.

According to the article storage structure of the above (5), the following effects can be obtained.

Since the first support member and the second support member are integrally formed, compared to the case of having the first support member and the second support member formed separately, the number of parts can be reduced, which is advantageous in cost.

According to the article storage structure of the above (6), the following effects can be obtained.

The first support member and the second support member are fixed to the vehicle body. The one end portion of the fixing component is supported by the first support member and the other end portion thereof is engaged with the second support member. Accordingly, the article can be fixed to the vehicle body by the first support member, the second support member, and the fixing component.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 8:
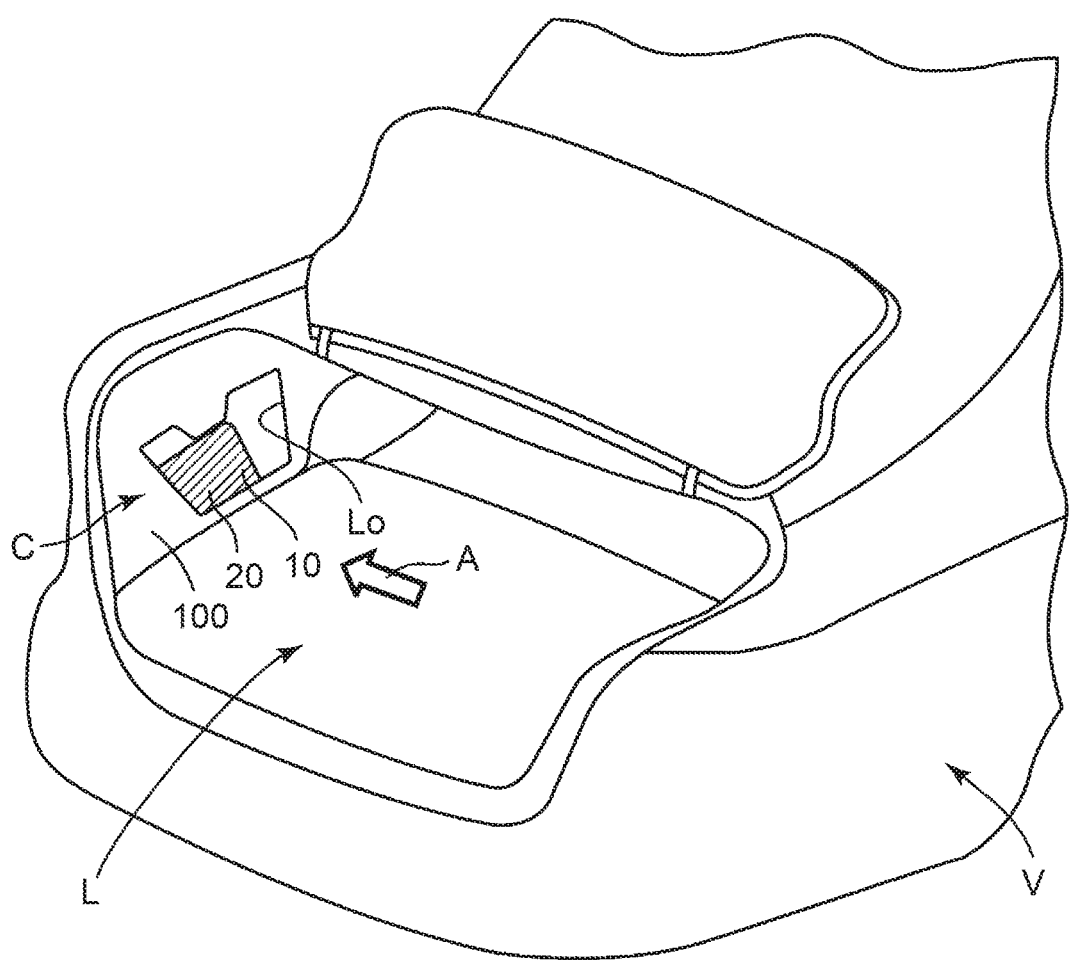
FIG. 8 is a partial perspective view of a vehicle provided with the article storage structure according to the embodiment of the present disclosure.
Figure 9:
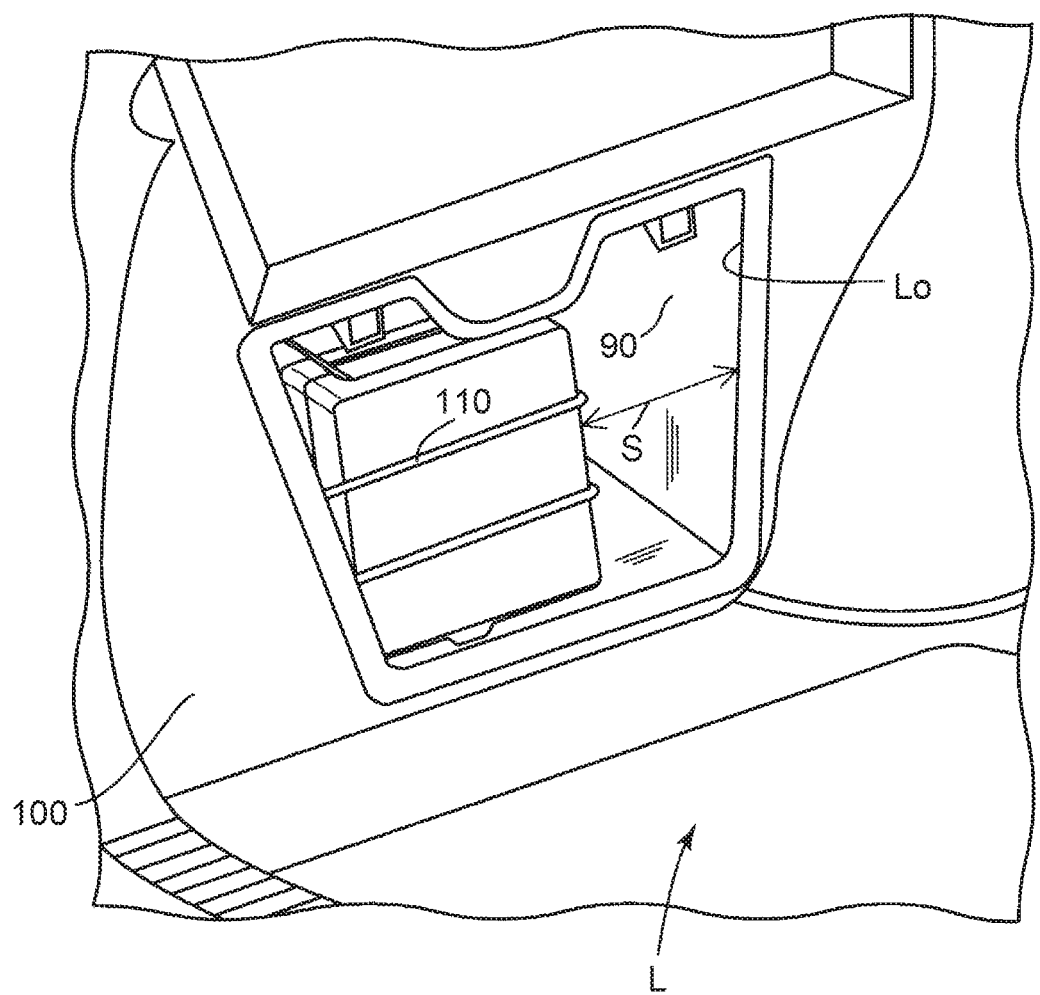
FIG. 9 is an enlarged view of a part C in FIG. 8.

Hereinafter, an article storage structure of an embodiment of the present disclosure will be described with reference to the drawings. The article storage structure 10 according to the embodiment of the present disclosure is not particularly limited; however, as shown in FIG. 8, FIG. 9, the article storage structure 10 is configured to store an article 20 from an opening Lo provided on a luggage side located on one side in the vehicle left-right direction of a luggage room L of a vehicle V. The opening Lo is formed to a luggage side trim 100 that covers a vehicle body 90 from the luggage room L side. Note that in the following description, a view of the article storage structure 10 as viewed from the luggage room L side is defined as a front view of the article storage structure 10 (a view indicated by an arrow A in the drawing), and description will be provided on the article storage structure 10 according to the embodiment of the present disclosure in the front view unless otherwise specified.

Figure 1:
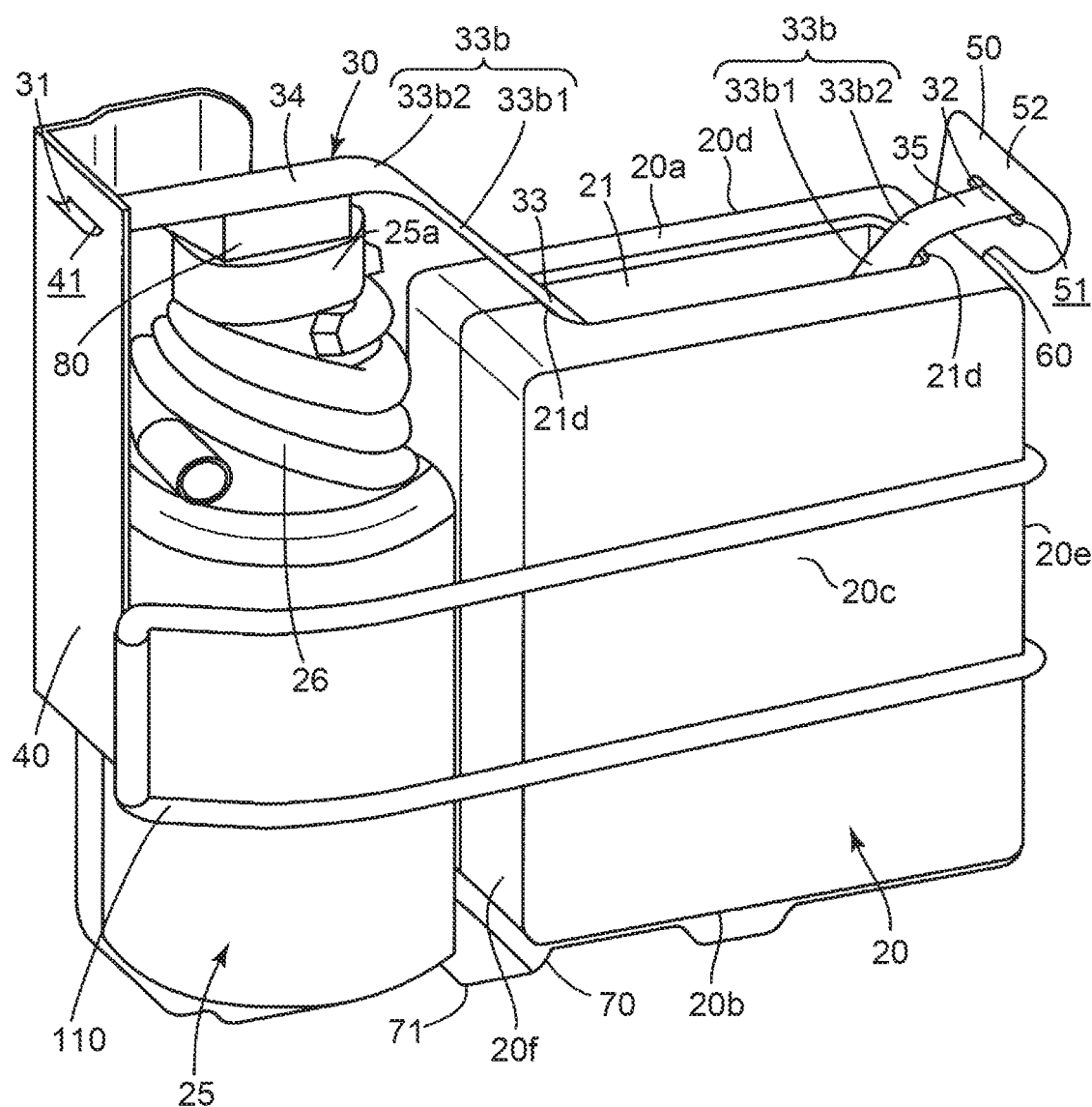
FIG. 1 is a perspective view of an article storage structure according to an embodiment of the present disclosure.
Figure 2:
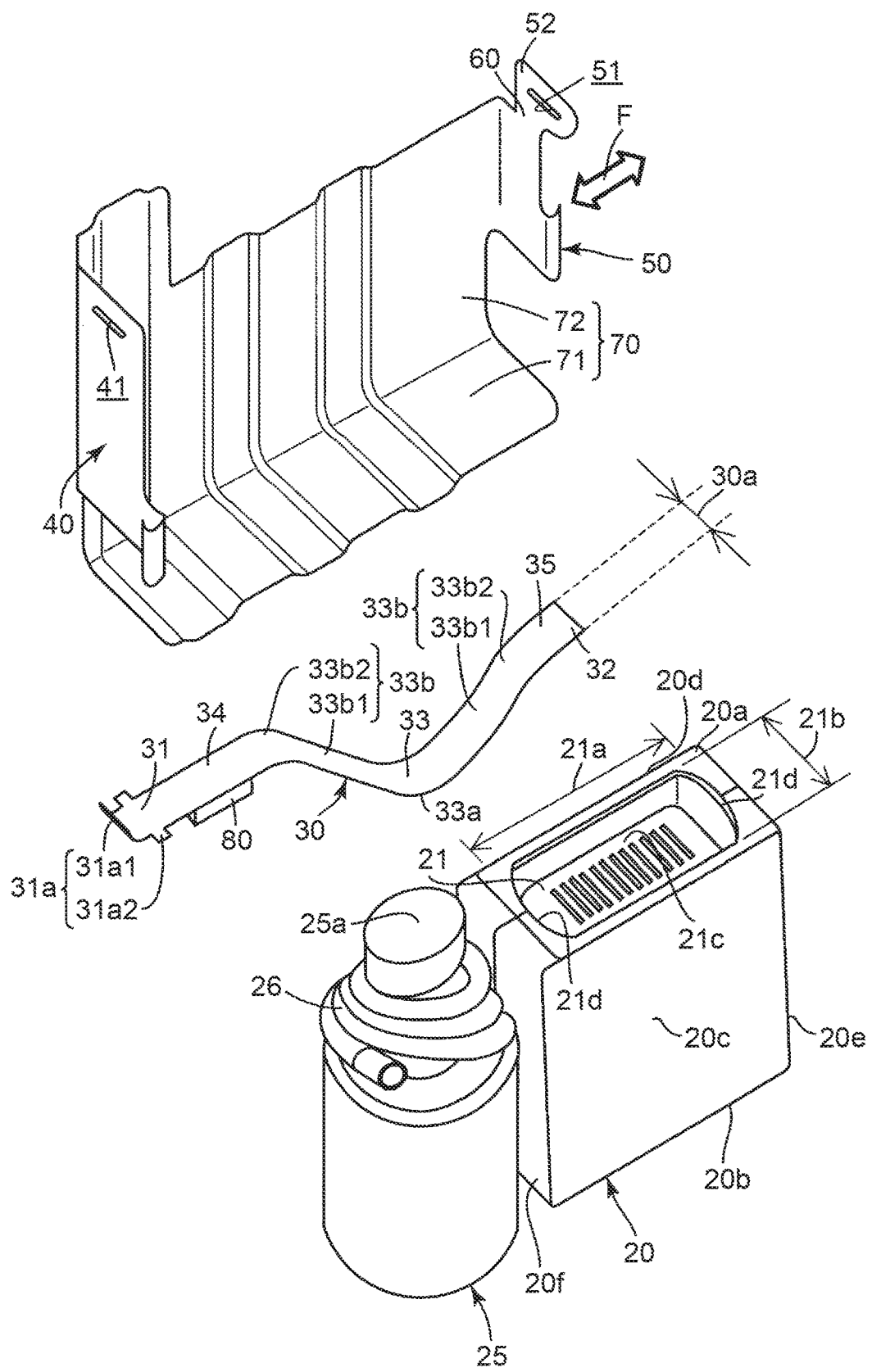
FIG. 2 is an exploded perspective view of the article storage structure according to the embodiment of the present disclosure.

As shown in FIG. 2, the article storage structure 10 according to the embodiment of the present disclosure includes: an article 20; a fixing component 30; a first support member 40; and a second support member 50.

The article 20 is an article mounted in a car, and is a compressor of a puncture repair kit. However, the article 20 is not limited to the compressor, and may be a battery (auxiliary battery) used for starting up the engine, or may be another article mounted on the car.

The article 20 has such a rigidity that the article 20 is not deformed even when being pushed by the fixing component 30, the first support member 40 and/or the second support member 50. The article 20 has a substantially rectangular parallelepiped shape, and includes: an upper surface 20a that is an opposite surface facing the fixing component 30; a lower surface 20b on the opposite side to the upper surface 20a; a front surface 20c; and a rear surface 20d on the opposite side to the front surface 20c; a right side surface 20e; and a left side surface 20f on the opposite side to the right side surface 20e. A length of the article 20 in the left-right direction (a distance between the right side surface 20e and the left side surface 20f) is larger than a length of the article 20 in the front-rear direction (a distance between the front surface 20c and the rear surface 20d).

The upper surface 20a of the article 20 is provided with a recess 21 that is recessed in a direction away from the fixing component 30 (downward). The recess 21 is provided over substantially the entire area of the upper surface 20a of the article 20. The shape of the recess 21 in a plan view is a shape slightly smaller than the upper surface 20a of the article 20, and has a rectangular shape having a lateral length 21a in the left-right direction larger than a longitudinal length 21b in the front-rear direction. A bottom surface 21c of the recess 21 is a flat surface.

A bottle container 25 containing a puncture repair material is provided independently of the article 20 on the left lateral side to the article 20, that is, at a position facing the left side surface 20f of the article 20. A hose 26 to be connected to a tire (not shown) when the tire is punctured is wound around the bottle container 25. A length (height) in the height direction of the bottle container 25 is larger than a length (height) in the height direction of the article 20, and an upper end portion 25a of the bottle container 25 is located closer to the fixing component 30 (upper) than the upper surface 20a of the article 20 is.

The fixing component 30 has a band shape having a constant thickness (including a substantially constant thickness) and a constant width (including a substantially constant width) in the entire extending direction. A width 30a of the fixing component 30 is the same as or narrower by a tolerance than the longitudinal length 21b of the recess 21 of the article 20. The fixing component 30 is disposed above the article 20 and fixes the article 20 by interfering with the article 20 from above. The fixing component 30 may have a multi-component configuration, but it is desirable to have a single-component configuration in order to reduce the number of parts.

The fixing component 30 may be a rigid body formed of a highly rigid material, but may be formed of a material elastically deformable but hardly plastically deformed. That is, in some embodiments, the fixing component 30 is formed of a material having low rigidity and high strength. The fixing component 30 may be made of metal or resin. If the fixing component 30 is made of metal, the fixing component 30 is formed of a high-strength steel plate (thin plate material) having a thickness of less than 1 mm, for example. In addition, if the fixing component 30 is made of resin, the fixing component 30 is formed of CFRP (carbon fiber reinforced plastics), GFRP (glass fiber reinforced plastics), or the like, for example.

The band-shaped fixing component 30 has one end portion 31, the other end portion 32, a curved portion 33, a one end side connecting portion 34, and the other end side connecting portion 35 in its extending direction.

Figure 7:
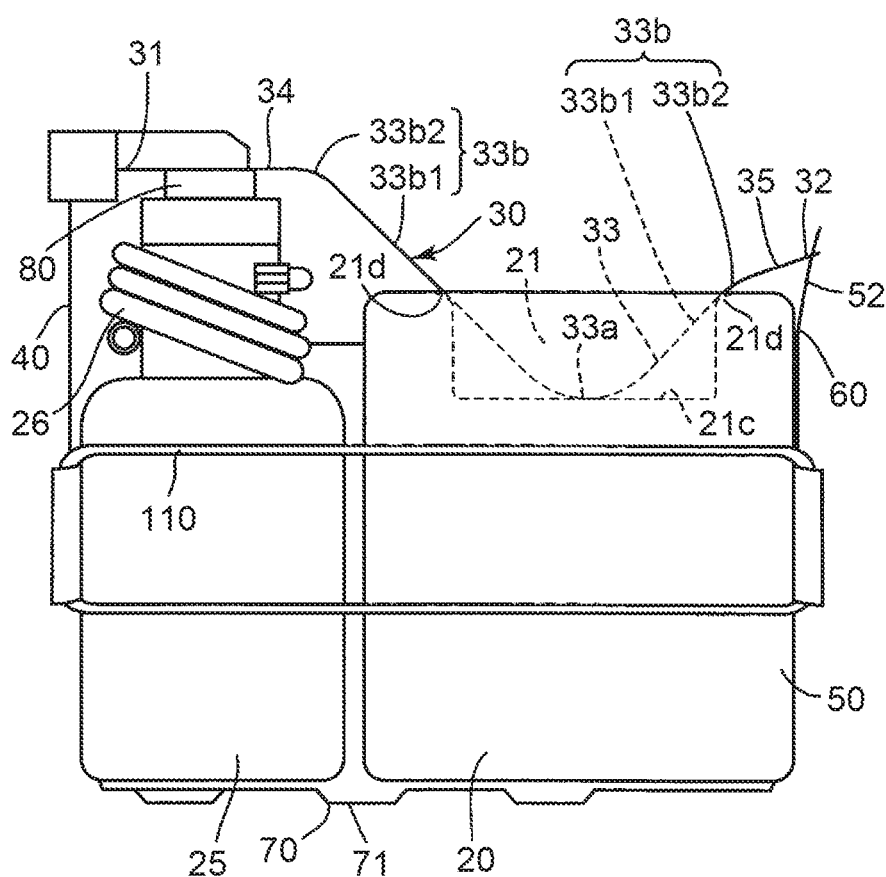
FIG. 7 is a front view of the article storage structure in a modification of the embodiment of the present disclosure.

The one end portion 31 is supported by the first support member 40. The one end portion 31 is provided with a stopper 31a. The stopper 31a includes a retaining portion 31a1 and a projecting portion 31a2. The retaining portion 31a1 is formed by bending a front end of the one end portion 31 as well as the vicinity thereof in a direction different from the width direction of the fixing component 30. The projecting portion 31a2 is provided at a position distant from the retaining portion 31a1, and is provided to project in the width direction of the fixing component 30. By inserting the retaining portion 31a1 into a through-hole 41 provided in the first support member 40 and by positioning the retaining portion 31a1 on the opposite side of the first support member 40 from the projecting portion 31a2, the one end portion 31 is supported by the first support member 40. As shown in FIG. 7, the one end portion 31 of the fixing component 30 may be fixed to the first support member 40, and may be formed integrally with the first support member 40.

Returning to FIG. 2, the other end portion 32 is detachably engaged with the second support member 50. When the other end portion 32 is inserted in a through-hole 51 provided in the second support member 50, the other end portion 32 is in engagement with the second support member 50, and when the other end portion 32 is out of the through-hole 51 provided in the second support member 50, the other end portion 32 is out of engagement with the second support member 50 and is in a state of being detached from the second support member 50.

In a state in which the one end portion 31 is supported by the first support member 40, by elastically deforming and restoring an elastic portion 60 described later, the other end portion 32 is inserted into (engaged with) the through-hole 51 of the second support member 50.

Figure 3:
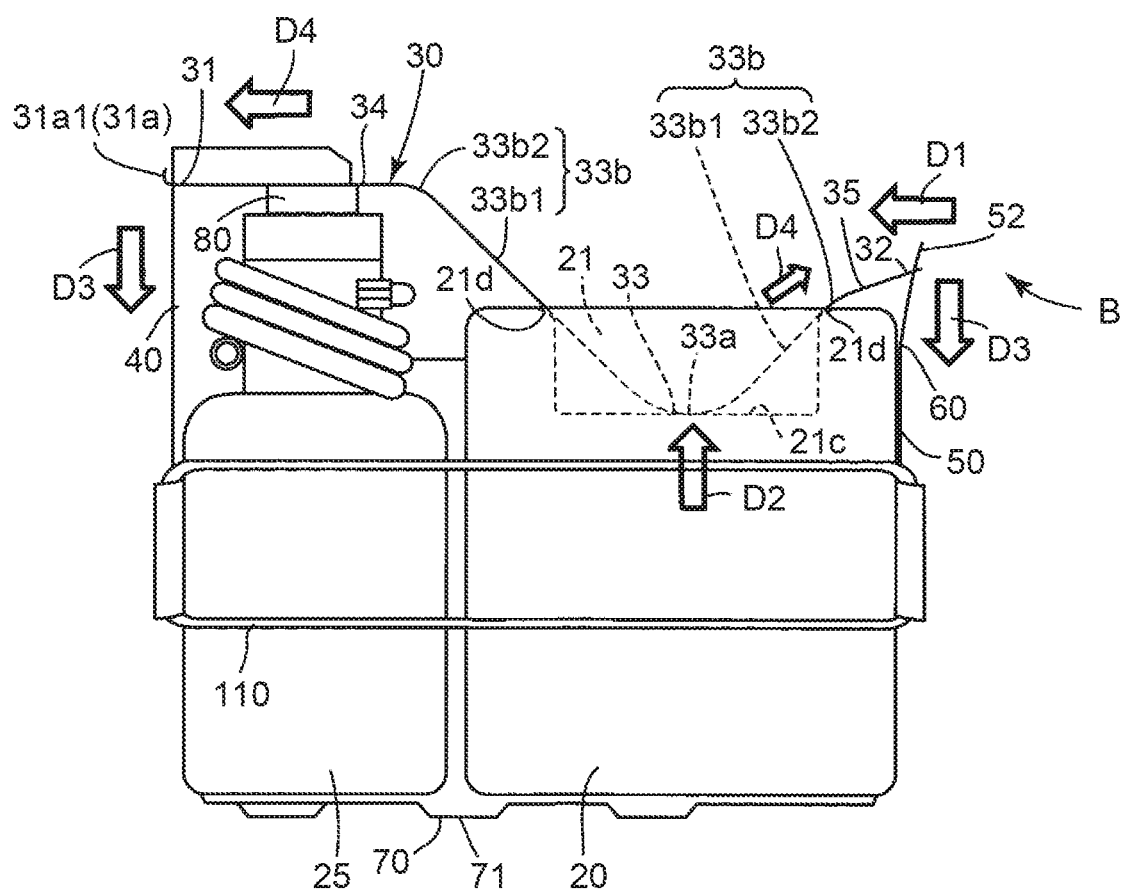
FIG. 3 is a front view of the article storage structure according to the embodiment of the present disclosure.

As shown in FIG. 3, the curved portion 33 is provided between the one end portion 31 and the other end portion 32 in such a manner as to be convex toward the article 20 (downward). Only a single curved portion 33 is provided. The curved portion 33 includes: a minimum portion 33a including a lowermost end portion; and a pair of inclined portions 33b that are located on both sides of the minimum portion 33a and are inclined upward in a direction away from the minimum portion 33a. The pair of inclined portions 33b each includes a straight portion 33b1 that is continuous with the minimum portion 33a and extends linearly (including a substantially linear shape), and a transition portion 33b2 that is continuous with the straight portion 33b1 and extends in a curved manner.

When the one end portion 31 of the fixing component 30 is in a state of being supported by the first support member 40 and the other end portion 32 of the fixing component 30 is engaged with the second support member 50, the curved portion 33 interferes with the article 20 to fix the article 20.

When the one end portion 31 is in a state of being supported by the first support member 40 and the other end portion 32 is engaged with the second support member 50, the curved portion 33 is inserted in the recess 21 of the article 20 and is in contact with the bottom surface 21c of the recess 21 at the minimum portion 33a of the curved portion 33. The curved portion 33 may be merely in contact with the bottom surface 21c of the recess 21, but the curved portion 33 may be pushed against the bottom surface 21c of the recess 21 by an elastic force (restoring force) of the elastic portion 60, and thus a reaction force is applied to the curved portion 33 from the article 20.

When the one end portion 31 is supported by the first support member 40 and the other end portion 32 is engaged with the second support member 50, the pair of inclined portions 33b of the curved portion 33 are in contact with left and right opening edges 21d of the recess 21, respectively. Only minimum gaps may be provided between the pair of inclined portions 33b and the respective left and right opening edges 21d.

The one end side connecting portion 34 is a portion that connects the one end portion 31 and the curved portion 33. The one end side connecting portion 34 extends linearly (including a substantially linear shape) between the one end portion 31 and the curved portion 33. The one end side connecting portion 34 is in the same region as that of the one end portion 31 or in a region closer to the article 20 (lower) than to the one end portion 31, and does not exist in a region upper than the one end portion 31. The one end side connecting portion 34 is continues with one of the inclined portions 33b of the curved portion 33.

The one end side connecting portion 34 may be located above the bottle container 25 and may fix the bottle container 25 by interfering with the bottle container 25 from above. In addition, if abnormal noise is generated due to interference of the one end side connecting portion 34 with the bottle container 25, a cushioning material 80 may be provided between the one end side connecting portion 34 and the bottle container 25 in order to reduce the abnormal noise.

The other end side connecting portion 35 is a portion that connects the other end portion 32 and the curved portion 33. The other end side connecting portion 35 extends linearly (including a substantially linear shape) between the other end portion 32 and the curved portion 33. The other end side connecting portion 35 is in the same region as that of the other end portion 32 or in a region closer to the article 20 (lower) than to the other end portion 32, and does not exist in a region upper than the other end portion 32. The other end side connecting portion 35 is continuous with the other of the inclined portions 33b of the curved portion 33.

As shown in FIG. 2, the first support member 40 is provided to extend in the height direction at a position more leftward than the article 20 and the bottle container 25. The first support member 40 can support the article 20 and the bottle container 25 from the left side. The first support member 40 is formed with a through-hole 41 into which the one end portion 31 of the fixing component 30 is inserted, at the upper end portion or in the vicinity thereof of the first support member 40. The through-hole 41 has a shape slightly larger than the shape in a sectional view of the fixing component 30.

The second support member 50 is provided to extend in the height direction at a position more rightward than the article 20. The second support member 50 can support the article 20 and the bottle container 25 from the right side. The second support member 50 is formed with the through-hole 51 into which the other end portion 32 of the fixing component 30 is inserted, at the upper end portion or in the vicinity thereof of the second support member 50. The through-hole 51 has a shape slightly larger than the shape in a sectional view of the fixing component 30.

Although the first support member 40 and the second support member 50 may be formed separately from each other, the first support member 40 and the second support member 50 may be integrally formed via a tray 70 supporting the article 20. That is, in some embodiments, the first support member 40 and the second support member 50 are integrally formed with the tray 70. In addition, a body formed by the first support member 40, the second support member 50, and the tray 70 that are integrally formed may be called as a housing.

The first and the second support members 40, 50, and the tray 70 may be formed of a material that is elastically deformable but hardly plastically deformed. That is, in some embodiments, the first and the second support members 40, 50, and the tray 70 are formed of a material having low rigidity and high strength. The first and the second support members 40, 50, and the tray 70 may be made of metal or resin. When the first and the second support members 40, 50, and the tray 70 are made of metal, the first and the second support members 40, 50, and the tray 70 are formed by high-strength steel plates (thin plate materials) having a thickness of less than 1 mm, for example. When the first and the second support members 40, 50, and the tray 70 are made of resin, the first and the second support members 40, 50, and the tray 70 are formed of CFRP (carbon fiber reinforced plastics), GFRP (glass fiber reinforced plastics), or the like, for example.

The tray 70 includes a substantially flat floor portion 71 on which the article 20 and the bottle container 25 are placed, and a substantially flat standing wall portion 72 standing upright from the floor portion 71 at a position behind the article 20 and the bottle container 25. The standing wall portion 72 can support the article 20 and the bottle container 25 from behind.

The first support member 40 is provided to extend forward from a left end portion of the standing wall portion 72 of the tray 70. The second support member 50 is provided to extend forward from a right end portion of the standing wall portion 72 of the tray 70. The first support member 40 and the second support member 50 are provided at positions facing each other. The first and the second support members 40, 50 are separated in the height direction from the floor portion 71 of the tray 70. The tray 70 is fixed to the vehicle body 90 directly or via a bracket (not shown), to thereby fix the first and the second support members 40, 50 to the vehicle body 90.

The elastic portion (which may also be referred to as a weakened portion) 60 is provided to the second support member 50. However, the elastic portion 60 may be provided to at least any one of the fixing component 30, the first support member 40, and the second support member 50.

The elastic portion 60 is provided through the entire area in the front-rear direction of the second support member 50 at an intermediate part in the height direction of the second support member 50. The elastic portion 60 elastically deforms (bends) itself, and thereby a part of the second support member 50 (hereinafter referred to as an elastic upper portion 52) located above the elastic portion 60 is displaced in the left-right direction, that is, in a direction closer to or apart from the first support member 40 (an arrow F in FIG. 2). The through-hole 51 is formed in the elastic upper portion 52. The elastic portion 60 is produced by reducing the thickness of a part of the second support member 50 than the thickness of the other parts thereof, by shortening the length in the front-rear direction of a part of the second support member 50 than the length of the other parts thereof, and by providing a hole in a part of the second support member 50, etc.

Figure 4A:
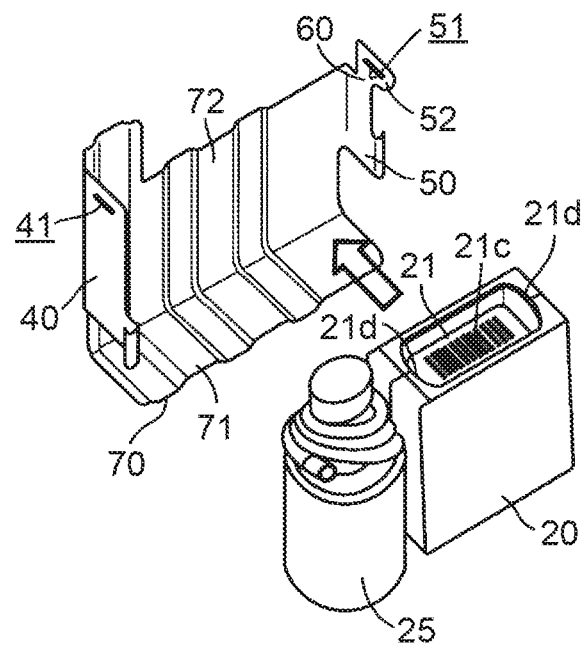
FIG. 4A is a process diagram showing a fixing method of the article in the article storage structure of the embodiment of the present disclosure and a perspective view of the article, a first support member, a second support member, and a tray before the article is set to the first support member, the second support member, and the tray.
Figure 4B:
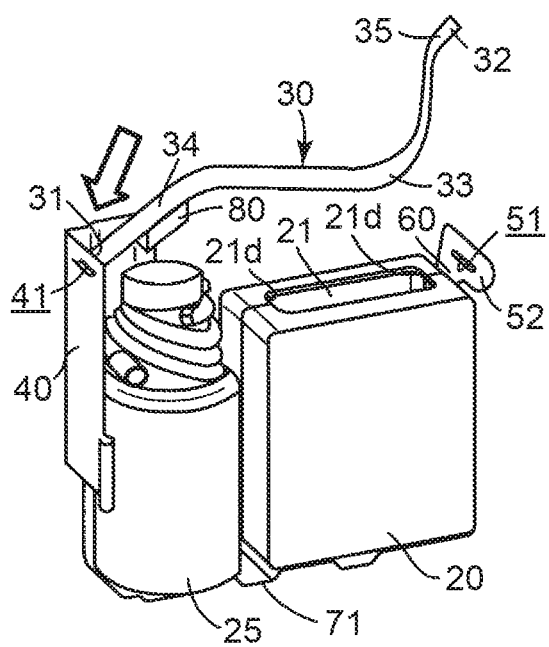
FIG. 4B is a process diagram showing a fixing method of the article in the article storage structure of the embodiment of the present disclosure and a perspective view of the article storage structure in a state in which one end portion of a fixing component is supported by a first support member.
Figure 4C:
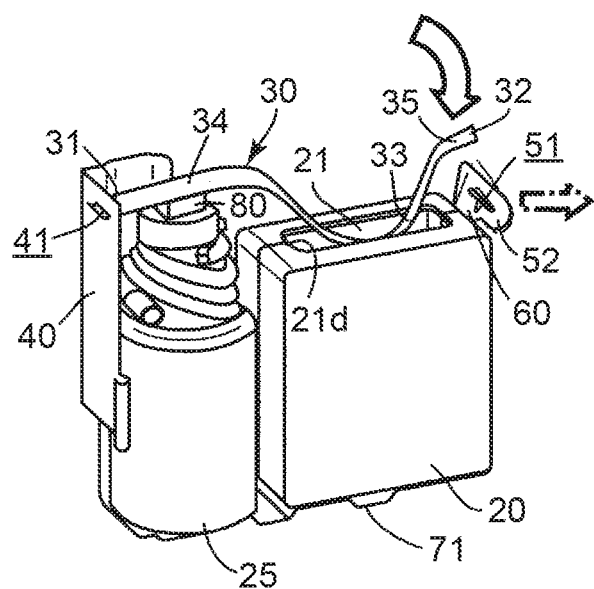
FIG. 4C is a process diagram showing a fixing method of the article in the article storage structure of the embodiment of the present disclosure and a perspective view of the article storage structure in a state immediately before the other end portion of the fixing component is engaged with the second support member.
Figure 4D:
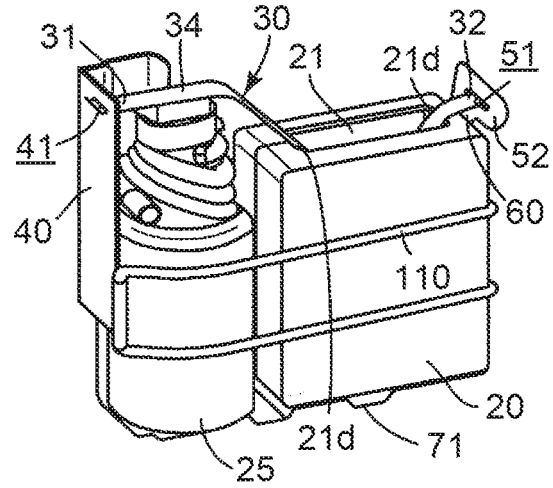
FIG. 4D is a process diagram showing a fixing method of the article in the article storage structure of the embodiment of the present disclosure and a perspective view of the article storage structure in a state in which the other end portion of the fixing component is engaged with the second support member.

Here, a fixing method of the article 20 in the article storage structure 10 will be described. The fixing method of the article 20 includes:

(i) as shown in FIG. 4A, a step of setting the article 20 and the bottle container 25 at the first and the second support members 40, 50 (and on the tray 70);

(ii) as shown in FIG. 4B, a step of putting (inserting) the one end portion 31 of the fixing component 30 into the through-hole 41 of the first support member 40 and hooking the one end portion 31 thereto so as to support the one end portion 31 by the first support member 40;

(iii) as shown in FIG. 4C, a step of turning the fixing component 30 around the one end portion 31 toward the article 20 (downward) so as to meet the curved portion 33 of the fixing component 30 to the recess 21 of the article 20 and insert (put) the curved portion 33 into the recess 21; and (iv) as shown in FIG. 4D, a step of pushing down the other end portion 32 of the fixing component 30 to the article 20 (downward), and elastically deforming the elastic portion 60 to displace the elastic upper portion 52, to thereby insert (engage) the other end portion 32 into the through-hole 51 of the second support member 50; and the above steps are performed in this order.

Regarding the Step (i)

(i-a) The step (i) is performed in a state in which the first and the second support members 40, 50 are fixed to the vehicle body 90 in advance.

(i-b) The article 20 and the bottle container 25 may be set separately or simultaneously.

(i-c) In the case in which the article 20 is formed by a battery or the like and the bottle container 25 is not provided beside the article 20, only the article 20 is set but the bottle container 25 is not set.

(i-d) The step (i) can be performed by simply setting the article 20 and the bottle container 25; therefore, a user of the article storage structure 10 can perform this step with the user's one hand.

Regarding the Step (ii)

(ii-a) When the one end portion 31 is supported by the first support member 40, the stopper 31a prevents the one end portion 31 from coming off from the through-hole 41 of the first support member 40, to thereby prevent the fixing component 30 from falling off from the first support member 40.

(ii-b) This step is omitted when the one end portion 31 of the fixing component 30 is fixed to the first support member 40 or is formed integrally with the first support member 40.

(ii-c) The step (ii) is performed by simply inserting the one end portion 31 into the through-hole 41 of the first support member 40; therefore, the user of the article storage structure 10 can perform this step with the user's one hand.

Regarding the Step (iii)

(iii-a) Only the curved portion 33 of the fixing component 30 is inserted into the recess 21.

(iii-b) The step (iii) is performed by simply turning the fixing component 30 around the one end portion 31; therefore, the user of the article storage structure 10 can perform this step with the user's one hand.

Regarding the Step (iv)

(iv-a) Pushing the other end portion 32 of the fixing component 30 causes the elastic portion 60 to elastically deform, to thereby displace the elastic upper portion 52 of the second support member 50 in a direction away from the first support member 40 (toward the right side). When the other end portion 32 reaches the position of the through-hole 51 of the second support member 50, the elastic portion 60 is restored and the elastic upper portion 52 of the second support member 50 is displaced in a direction coming closer to the first support member 40 (toward the left side), and thus the other end portion 32 is inserted into (engaged with) the through-hole 51. Then, the other end portion 32 is prevented from coming off from the through-hole 51 by the restoring force of the elastic portion 60.

Figure 6:
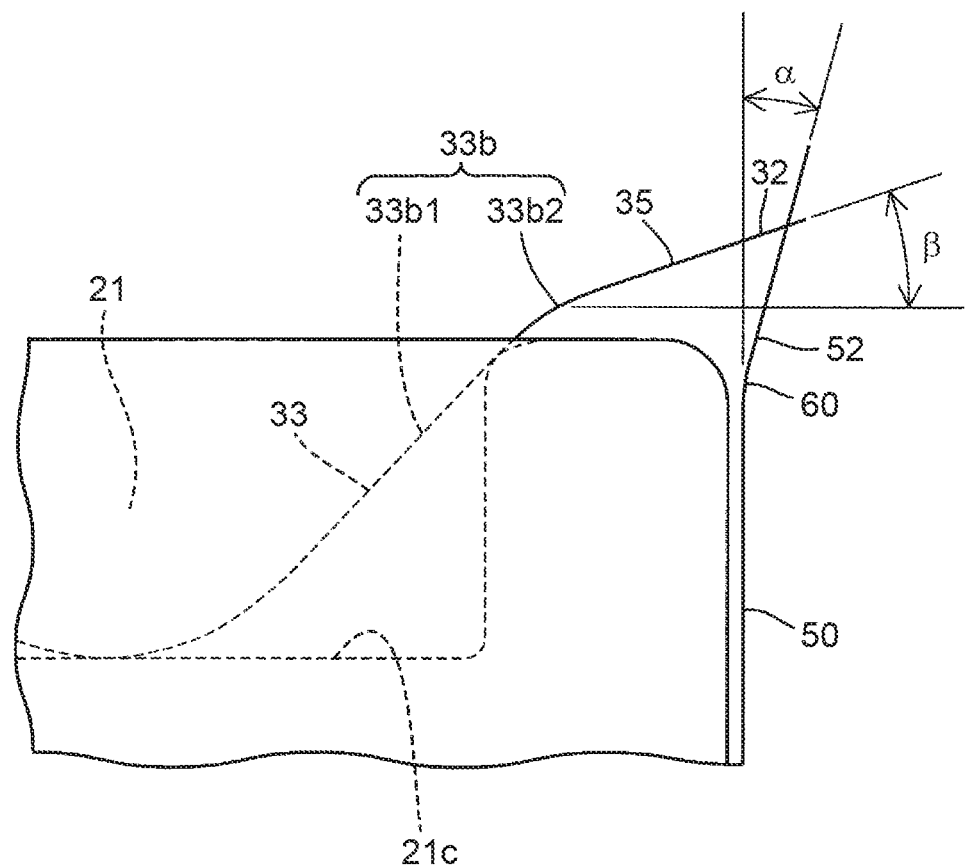
FIG. 6 is an enlarged view of a part B in FIG. 3.

(iv-b) As shown in FIG. 6, in light of easy bending and easy insertion into (easy hooking and easy engagement with) the through-hole 51 of the other end portion 32 of the fixing component 30, the elastic portion 60 may be incline by an angle α (0<α<45°) relative to the height direction (vertical direction). Further, in light of workability of pushing (easy pushing) and fixation of the article 20, the other end portion 32 of the fixing component 30 may be inclined by an angle β (0<β<45°) relative to a direction perpendicular to the height direction (horizontal direction). Although FIG. 6 illustrates a state in which the other end portion 32 of the fixing component 30 is engaged with the second support member 50, the angle α and the angle β may be satisfied not only in a state in which the other end portion 32 of the fixing component 30 is engaged with the second support member 50, but also even in a state before the other end portion 32 of the fixing component 30 is engaged with the second support member 50.

(iv-c) As shown in FIG. 3, when the other end portion 32 of the fixing component 30 is engaged with the second support member 50, the curved portion 33 of the fixing component 30 is in contact with the bottom surface 21c of the recess 21 of the article 20. Further, the curved portion 33 is pushed against the bottom surface 21c of the recess 21 by the restoring force of the elastic portion 60.

(iv-d) The step (iv) can be performed by simply pushing the other end portion 32 of the fixing component 30 toward the article 20 (downward); therefore, the user of the article storage structure 10 can perform this step with the user's one hand.

Release of the fixation of the article 20 fixed through the above steps (i) to (iv) is performed as follows.

Figure 5:
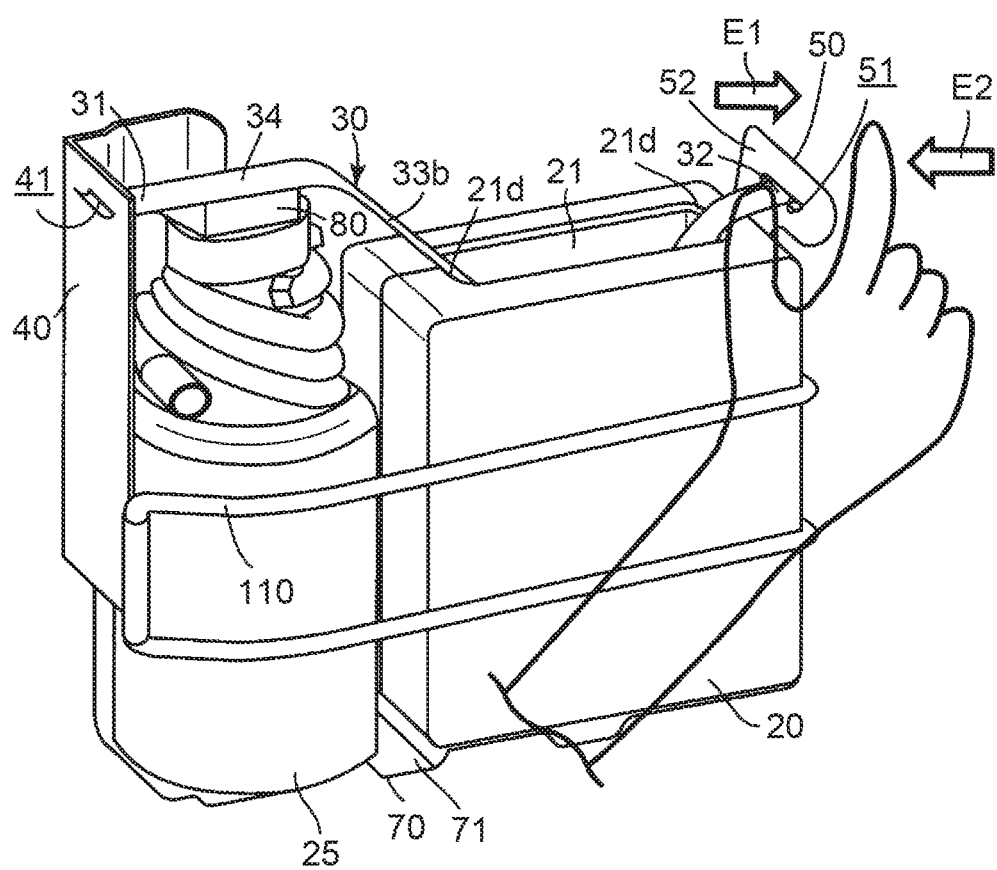
FIG. 5 is a perspective view of the article storage structure showing a fixing and releasing method of the article in the article storage structure according to the embodiment of the present disclosure.

As shown in FIG. 5, the elastic upper portion 52 of the second support member 50 is pushed toward a direction (the right side) E1 away from the first support member 40. Thereby, the elastic upper portion 52 of the second support member 50 is displaced by the elastic deformation of the elastic portion 60 so as to remove (pull out) the other end portion 32 of the fixing component 30 from the through-hole 51 of the second support member 50. In order to remove the other end portion 32 of the fixing component 30 from the through-hole 51, the front end of the other end portion 32 is pushed toward a left direction E2 to bend the fixing component 30, and thereby the other end portion 32 can be easily removed from the through-hole 51.

The pushing work of pushing the elastic upper portion 52 of the second support member 50 toward the direction (the right side) E1 away from the first support member 40 is performed with a thumb, for example, and the pushing work of pushing the front end of the other end portion 32 of the fixing component 30 toward the left direction E2 is performed with an index finger of the same hand, for example, and thereby the user of the article storage structure 10 can perform the fixing and releasing work with the user's one hand.

Next, operation and effects of the embodiment of the present disclosure will be described.

(A) As shown in FIG. 3, when the one end portion 31 of the fixing component 30 is supported by the first support member 40 and the other end portion 32 thereof is engaged with the second support member 50, a restoring force D1 of the elastic portion 60 is applied to the fixing component 30. Since the curved portion 33 is pushed against the bottom surface 21c of the recess 21 of the article 20, a reaction force D2 exerting upward from the article 20 is applied to the fixing component 30. Although the fixing component 30 tends to lift up by the reaction force D2, the one end portion 31 is supported by the first support member 40 and the other end portion 32 is engaged with the second support member 50, and these portions 31, 32 receive a downward force D3 from the respective upper edges of the through-holes 41, 51; therefore, the fixing component 30 does not lift up. Since the fixing component 30 does not lift up, a force D4 exerts on the fixing component 30 due to the reaction force D2 in a direction in which the one end portion 31 and the other end portion 32 separate from each other, but this force D4 is also suppressed by the first support member 40 and the second support member 50. As a result, the article 20 can be fixed to the first and the second support members 40, 50 in the height direction, by using the fixing component 30.

(B) In the embodiment of the present disclosure, the elastic portion 60 is elastically deformed to engage the other end portion 32 of the fixing component 30 with the second support member 50; therefore, when the fixing component 30 is engaged with the second support member 50, the elastic force (restoring force) of the elastic portion 60 causes the fixing component 30 to interfere (contact) with the article 20, to thereby fix the article 20. Since this structure requires no nut when fixing the article 20, a tool for fastening the nut is unnecessary, and thus the procedure of fixing the article 20 can be reduced, compared to the case in which a nut is required as with the related art.

(C) Since the curved portion 33 of the fixing component 30 is pushed against the article 20 by the elastic force of the elastic portion 60, the fixing component 30 can fix the article 20 and restrict the movement (rattling) of the article in the pushing direction (height direction).

(D) Since the curved portion 33 of the fixing component 30 is pushed against the article 20, more contact area between the fixing component 30 and the article 20 can be reduced, compared to the case in which the curved portion 33 is not provided and substantially the entire fixing component 30 is pushed against the entire surface of the article 20, so that a pushing load can be locally applied from the fixing component 30 to the article 20. Therefore, the pushing force per unit area from the fixing component 30 to the article 20 can be increased, and the holding force on the article 20 by the fixing component 30 can be increased.

(E) The one end side connecting portion 34 and the other end side connecting portion 35 of the fixing component 30 each linearly extend; therefore, when the one end portion 31 of the fixing component 30 is supported by the first support member 40 and the other end portion 32 thereof is engaged with the second support member 50, and thus the curved portion 33 is pushed against the article 20 and receives the reaction force D2 from the article 20 at the same time, a force mainly applied to the one end side connecting portion 34 and the other end side connecting portion 35 can be used as a compressive force. Therefore, it is possible to suppress the one end side connecting portion 34 and the other end side connecting portion 35 from being bent and deformed when the fixing component 30 receives the reaction force D2 from the article 20, and thus the curved portion 33 can be efficiently pushed against the article 20.

(F) Since the curved portion 33 is inserted into the recess 21 of the article 20, the article 20 is only allowed to move in the directions (the front-rear direction, the left-right direction) excluding the direction of being pushed against the fixing component 30 just until the wall surface of the recess 21 hits (comes in contact with) the curved portion 33. Therefore, it is possible to restrict the article 20 from moving in the directions excluding the direction in which the article 20 is pushed against the fixing component 30. Specifically, since the width 30a of the fixing component 30 is set to be the same as or narrower by a tolerance than the longitudinal length 21b of the recess 21 of the article 20, it is possible to restrict the article 20 from moving in the front-rear direction with respect to the fixing component 30, simply by inserting the curved portion 33 into the recess 21. Since the pair of inclined portions 33b of the curved portion 33 contacts respectively with the left and right opening edges 21d of the recess 21 or has only a minimum gap between the inclined portions 33b and the opening edges 21d, it is possible to restrict the article 20 from moving in the left-right direction with respect to the fixing component 30, simply by inserting the curved portion 33 into the recess 21.

(G) Through the above (A) to (C) and the above (F), the article 20 can be restricted in all the directions of the up-down direction, the front-rear direction, and the left-right direction using the fixing component 30. Accordingly, stable fixation of the article 20 can be attained.

(H) Since the first support member 40 and the second support member 50 are integrally formed, compared to the case of having the first support member 40 and the second support member 50 formed separately, the number of parts can be reduced, which is advantageous in cost.

(I) The first support member 40 and the second support member 50 are fixed to the vehicle body 90. The one end portion 31 of the fixing component 30 is supported by the first support member 40 and the other end portion 32 thereof is engaged with the second support member 50. Accordingly, the article 20 can be fixed to the vehicle body 90 by the first support member 40, the second support member 50, and the fixing component 30.

(J) The article 20 can be fixed to and released from the first and the second support members 40, 50 with the user's one hand; therefore, as shown in FIG. 9, even in a case in which there is a space (width) S accessible with just one hand (about 80 mm, for example) toward the back side of (behind) the article storage structure 10 from the opening Lo provided on the luggage side, the article 20 can be fixed to and released from the first and the second support members 40, 50.

(K) The fixing component 30, the first support member 40, and the second support member 50 each have a simple and inexpensive structure that they can be manufactured even using a steel plate (iron plate), which is advantageous in cost reduction.

(L) The first support member 40 and the second support member 50 are provided, the first support member 40 is located on the left side to the article 20, and the second support member 50 is located on the right side to the article 20; therefore, a rubber band 110 can be easily wound around and across the first and the second support members 40, 50. Accordingly, the fixing force on the article 20 can be increased by using the rubber band 110.

In the embodiment of the present disclosure, although the description has been provided on the case in which the elastic portion 60 is provided only at an intermediate part in the height direction of the second support member 50, the elastic portion 60 may be provided only at an intermediate part in the height direction of the first support member 40, or may be provided only at an intermediate part in the extending direction of the fixing component 30. The elastic portion 60 may be provided at least one of the intermediate part in the height direction of the second support member 50, the intermediate part in the height direction of the first support member 40, and the intermediate part in the extending direction of the fixing component 30.

What is claimed is:
1. An article storage structure comprising:
an article;
a fixing component interfering with the article so as to fix the article, the fixing component having one end portion and an opposite other end portion;
a first support member supporting the one end portion of the fixing component; and
a second support member with which the other end portion of the fixing component is detachably engaged, wherein the second support member includes an elastic portion that is elastically deformable, and the fixing component interferes with the article so as to fix the article by elastically deforming the elastic portion to engage the other end portion of the fixing component with the second support member.

2. The article storage structure according to claim 1, wherein:

the fixing component has a curved portion between the one end portion and the other end portion of the fixing component, the curved portion being convex toward the article; and when the other end portion of the fixing component is engaged with the second support member, the curved portion is pushed against the article by an elastic force of the elastic portion.

3. The article storage structure according to claim 2, wherein:

the fixing component includes a one end side connecting portion that connects the one end portion to the curved portion, and an other end side connecting portion that connects the other end portion to the curved portion; and the one end side connecting portion extends linearly between the one end portion and the curved portion, and the other end side connecting portion extends linearly between the other end portion and the curved portion.

4. The article storage structure according to claim 2, wherein:

the article has a recess in a face of the article facing the fixing component, the recess being recessed in a direction away from the fixing component, and the curved portion is inserted in the recess when the other end portion of the fixing component is engaged with the second support member.

5. The article storage structure according to claim 1, further comprising a tray supporting the article, wherein the first support member and the second support member are integrally formed with the tray.

6. The article storage structure according to claim 1, wherein the article is an in-vehicle article, and the first support member and the second support member are fixed to a vehicle.

7. The article storage structure according to claim 3, wherein:

the article has a recess in a face of the article facing the fixing component, the recess being recessed in a direction away from the fixing component, and the curved portion is inserted in the recess when the other end portion of the fixing component is engaged with the second support member.

8. The article storage structure according to claim 2, further comprising a tray supporting the article, wherein the first support member and the second support member are integrally formed with the tray.

9. The article storage structure according to claim 3, further comprising a tray supporting the article, wherein the first support member and the second support member are integrally formed with the tray.

10. The article storage structure according to claim 4, further comprising a tray supporting the article, wherein the first support member and the second support member are integrally formed with the tray.

11. The article storage structure according to claim 7, further comprising a tray supporting the article, wherein the first support member and the second support member are integrally formed with the tray.

12. The article storage structure according to claim 2, wherein the article is an in-vehicle article, and the first support member and the second support member are fixed to a vehicle.

13. The article storage structure according to claim 3, wherein the article is an in-vehicle article, and the first support member and the second support member are fixed to a vehicle.

14. The article storage structure according to claim 4, wherein the article is an in-vehicle article, and the first support member and the second support member are fixed to a vehicle.

15. The article storage structure according to claim 5, wherein the article is an in-vehicle article, and the first support member and the second support member are fixed to a vehicle.

16. The article storage structure according to claim 7, wherein the article is an in-vehicle article, and the first support member and the second support member are fixed to a vehicle.

17. The article storage structure according to claim 8, wherein the article is an in-vehicle article, and the first support member and the second support member are fixed to a vehicle.

18. The article storage structure according to claim 9, wherein the article is an in-vehicle article, and the first support member and the second support member are fixed to a vehicle.

19. The article storage structure according to claim 10, wherein the article is an in-vehicle article, and the first support member and the second support member are fixed to a vehicle.

20. The article storage structure according to claim 11, wherein the article is an in-vehicle article, and the first support member and the second support member are fixed to a vehicle.

* * * * *